(12) United States Patent
Inagaki

(10) Patent No.: US 9,342,591 B2
(45) Date of Patent: May 17, 2016

(54) APPARATUS FOR CLUSTERING A PLURALITY OF DOCUMENTS

(71) Applicant: International Business Machines Corporation, Armonk, NY (US)

(72) Inventor: Takeshi Inagaki, Kanagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 252 days.

(21) Appl. No.: 13/766,889

(22) Filed: Feb. 14, 2013

(65) Prior Publication Data

US 2013/0212106 A1    Aug. 15, 2013

(30) Foreign Application Priority Data

Feb. 14, 2012   (JP) .................. 2012-029257

(51) Int. Cl.
*G06F 17/30*  (2006.01)
(52) U.S. Cl.
CPC ................ *G06F 17/3071* (2013.01)
(58) Field of Classification Search
CPC ................ G06F 17/3071
USPC ............................................. 707/738
See application file for complete search history.

(56) References Cited

U.S. PATENT DOCUMENTS 5,794,178 A * 8/1998 Caid ............... G06F 17/30265
345/440
8,805,841 B2 * 8/2014 Takahashi ....... G06F 17/30705
707/737

2007/0050356 A1 * 3/2007 Amadio .............. G06F 17/3071
2007/0203996 A1 * 8/2007 Davitz ................. H04L 12/588
709/206
2008/0319974 A1 * 12/2008 Ma ................... G06F 17/30241
(Continued)

FOREIGN PATENT DOCUMENTS

CN    WO 2012106885 A1 *  8/2012   ........ G06F 17/30011
JP         2005331440 A    12/2005
WO        2013121809 A1    8/2013

OTHER PUBLICATIONS

JP International Search Report for International Application No. PCT/JP2013/050476; International Filing Date: Jan. 11, 2013; Date of mailing: Aug. 22, 2013, 1 page.

(Continued)

*Primary Examiner* — Mariela Reyes
*Assistant Examiner* — Edward Jacobs
(74) *Attorney, Agent, or Firm* — Cantor Colburn LLP; Joseph Polimeni

(57) ABSTRACT

According to an aspect, there are provided an apparatus, a program for causing a computer to function as such an apparatus, and a method, wherein the apparatus includes a selection section for selecting a plurality of sample documents from a plurality of documents and a first parameter generation section for analyzing the plurality of sample documents to generate an initial parameter matrix expressing a probability that each of a plurality of words included in the plurality of sample documents is included in each of a plurality of topics. The apparatus also includes a second parameter generation section for analyzing the plurality of documents by using each value included in the initial parameter matrix as an initial value to generate a parameter matrix expressing a probability that each of a plurality of words included in the plurality of documents is included in each of a plurality of topics.

11 Claims, 9 Drawing Sheets

(56) References Cited

U.S. PATENT DOCUMENTS

| | | | | |
|---|---|---|---|---|
| 2009/0254884 | A1* | 10/2009 | Rama | G06F 8/75 717/124 |
| 2009/0271433 | A1* | 10/2009 | Perronnin | G06K 9/6224 |
| 2010/0179933 | A1* | 7/2010 | Bai | G06F 17/30663 706/12 |
| 2010/0280985 | A1* | 11/2010 | Duchon | G06Q 10/10 706/52 |
| 2011/0078167 | A1* | 3/2011 | Sundaresan | G06F 17/2785 707/765 |
| 2011/0202484 | A1* | 8/2011 | Anerousis | G06N 7/005 706/12 |
| 2011/0258229 | A1* | 10/2011 | Ni | G06F 17/277 707/776 |
| 2012/0030206 | A1* | 2/2012 | Shi | G06F 17/30707 707/738 |
| 2012/0089621 | A1* | 4/2012 | Liu | G06F 17/30699 707/749 |
| 2012/0095952 | A1* | 4/2012 | Archambeau et al. | 706/52 |
| 2012/0101965 | A1* | 4/2012 | Hennig | G06N 7/005 706/12 |
| 2012/0166179 | A1* | 6/2012 | Tirumalachetty | G06F 17/2745 704/9 |
| 2012/0203752 | A1* | 8/2012 | Ha-Thuc | G06F 17/30705 707/706 |
| 2012/0290988 | A1* | 11/2012 | Sun | G06F 17/30572 715/853 |
| 2012/0330958 | A1* | 12/2012 | Xu et al. | 707/738 |
| 2013/0151531 | A1* | 6/2013 | Li | G06F 17/30734 707/740 |
| 2013/0204885 | A1* | 8/2013 | Clinchant | G06K 9/4676 707/756 |
| 2014/0317121 | A1* | 10/2014 | Inagaki | G06F 17/30707 707/739 |

OTHER PUBLICATIONS

D. Blei, et al., "Latent Dirichlet Allocation," Journal of Machine Learning Research 3 (2003); pp. 993-1022.

G. Cormode, et al., "Anonymizecl Data: Generation, Models, Usage," SIGMOD' 09, Providence, RI, USA; pp. 1015-1018.

Y. Wang, et al., "PLDA: Parallel Latent Dirichlet Allocation for Large-scale Applications," Lecture Notes in Computer Science vol. 5564, 2009, pp. 301-314.

Oracle, "Data Masking Best Practices," An Oracle White Paper, Jul. 2010; Author: Jagan R. Athreya; pp. 1-14.

K. Fukumasu, et al., "Cross-Lingual Link Detection using Multilingual Topic Models," IPSJ SIG Technical Report 2011 [CD-ROM], Jun. 15, 2011, read at conferences in Apr. and May of 2011, pp. 1-7.

K. Hayashi, et al., "Probabilistic Topic Models with Category Hierarchy and it's Applications," IPSJ SIG Technical Report 2010 [CD-ROM], Feb. 15, 2011, read at conferences in Dec. 2010 and Jan. 2011, pp. 1-8.

T. Masada, "Dimensionality Reduction via Latent Dirichlet Allocation for Document Clustering," IPSJ SIG Technical Report, Jul. 4, 2007, vol. 2007, No. 65, pp. 381-386.

R. Miyagaki, et al., "Clustering of Phone HMMs based on Latent Dirichlet Allocation," IPSJ SIG Technical Report 20120 [DVD-ROM], Apr. 15, 2011, read at conferences in Feb. and Mar. of 2011, pp. 1-6.

L. Yao, et al., "Efficient Methods for Topic Model Inference on Streaming Document Collections," KDD '09 Proceedings of the 15th ACM SIGKDD International Conference on Knowledge Discovery and Data Mining, Association for Computing Machinery, Dec. 31, 2009, pp. 937-945.

* cited by examiner (1)  initialize $\phi_{ni}^0 := 1/k$ for all $i$ and $n$ (2)  initialize $\gamma_i^0 := \alpha_i + N/k$ for all $i$ (3)  repeat (4)    for $n = 1$ to $N$ (5)      for $i = 1$ to $k$ (6)        $\phi_{ni}^{t+1} := \beta_{iw_n} \exp\left(\Psi\left(\gamma_i^t\right)\right)$ (7)      normalize $\phi_{ni}^{t+1}$ to sum to 1.

(8)    $\gamma_i^{t+1} := \alpha_i + \sum_{n=1}^{N} \phi_{ni}^{t+1}$ (9)  until convergence

APPARATUS FOR CLUSTERING A PLURALITY OF DOCUMENTS

PRIORITY

This application claims priority to Japanese Patent Application No. 2012-029257, filed 14 Feb. 2012, and all the benefits accruing therefrom under 35 U.S.C. §119, the contents of which in its entirety are herein incorporated by reference.

BACKGROUND

The present invention relates to an apparatus, a program, and a method for clustering a plurality of documents.

LDA (Latent Dirichlet Allocation) is known as an algorithm for analyzing a set of documents ("a document set") to cluster the documents.

When a document set is analyzed by LDA, a computer has to execute a number of processing steps that is equal or greater than a square of the number of words included in the document set to be analyzed. This can make it difficult to perform LDA analysis on a document set including, for example, tens or hundreds of millions of documents existing on a network.

The LDA's processes may be executed in parallel in a distributed processing environment. However, even if the LDA's processes are parallelized in such a distributed processing environment, it would be difficult to analyze a document set including tens or hundreds of millions of documents.

SUMMARY

According to a first aspect, there is provided an apparatus, a program for causing a computer to function as such an apparatus, and a method, wherein the apparatus includes a selection section for selecting a plurality of sample documents from a plurality of documents and a first parameter generation section for analyzing the plurality of sample documents to generate an initial parameter matrix expressing a probability that each of a plurality of words included in the plurality of sample documents is included in each of a plurality of topics. The apparatus also includes a second parameter generation section for analyzing the plurality of documents by using each value included in the initial parameter matrix as an initial value to generate a parameter matrix expressing a probability that each of a plurality of words included in the plurality of documents is included in each of a plurality of topics.

According to a second aspect, there is an apparatus provided, the apparatus including: a selection section for selecting a plurality of sample documents from the plurality of documents; a parameter generation section for analyzing the plurality of sample documents to generate a parameter matrix expressing a probability that each of a plurality of words included in the plurality of sample documents is included in each of a plurality of topics; and a clustering section for clustering the plurality of documents into a plurality of clusters based on the parameter matrix.

BRIEF DESCRIPTION OF THE SEVERAL VIEWS OF THE DRAWINGS

FIG. 8 shows an example of program code to be executed by a computer to implement LDA processes according to an embodiment.

DETAILED DESCRIPTION OF THE PREFERRED EMBODIMENTS

The present invention will now be described by way of embodiments. It should be noted that the following embodiments do not limit the appended claims, and all the combinations of the features described in the embodiments are not necessarily essential to the means for solving the problems of the embodiments.

Figure 1:
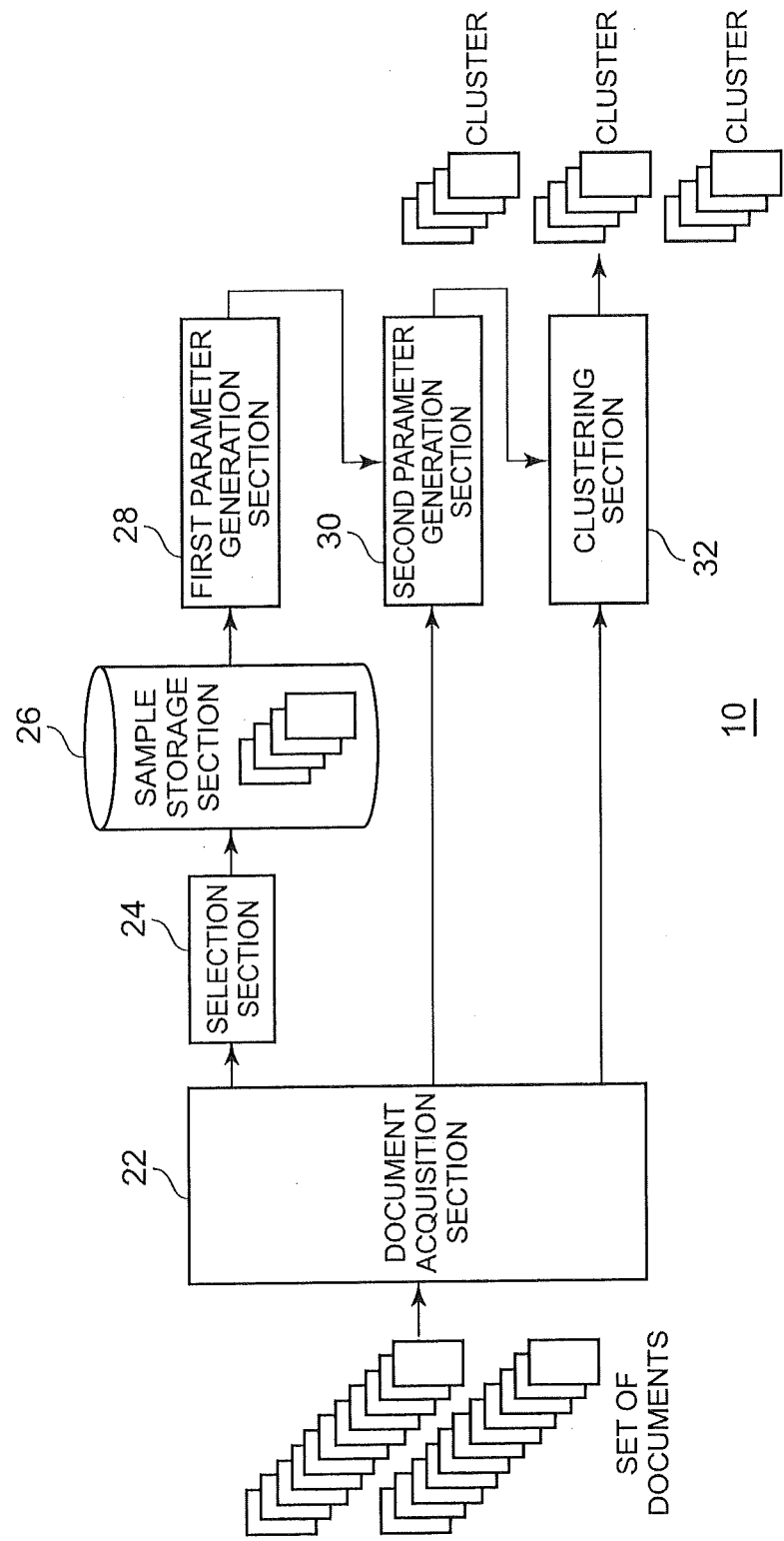
FIG. 1 is a diagram showing functional configuration of a clustering apparatus according to an embodiment.

FIG. 1 is a block diagram showing the functional configuration of a clustering apparatus 10 according to an embodiment. The clustering apparatus 10 clusters a set of text documents (e.g. a document set) into small sets (e.g. clusters) of a plurality of documents with each small set or cluster having similar contents.

The clustering apparatus 10 includes a document acquisition section 22, a selection section 24, a sample storage section 26, a first parameter generation section 28, a second parameter generation section 30, and a clustering section 32. Such a clustering apparatus 10 may be implemented by a computer executing a program.

The document acquisition section 22 acquires, from storage device, a server on a network, or similar apparatus, a document set to be clustered. The document acquisition section 22 acquires a document set including documents pre-structured to enable searches for words. When an unstructured document is included, the document acquisition section 22 may refer to a dictionary to structure the document.

The selection section 24 selects a plurality of sample documents from the document set acquired by the document acquisition section 22. In an embodiment, the selection section 24 selects sample documents at random. Further, as an example, the selection section 24 selects a preset number of sample documents.

The sample storage section 26 stores the plurality of sample documents selected by the selection section 24. The sample storage section 26 may store links, each of the links indicating a location where each document is stored.

The first parameter generation section 28 performs LDA (Latent Dirichlet Allocation) analysis on the plurality of sample documents stored in the sample storage section 26 to generate an initial parameter matrix expressing a probability that each of a plurality of words included in the plurality of sample documents is included in each of a plurality of topics. The initial parameter matrix corresponds to a parameter matrix $\beta$ calculated as a result of the LDA analysis. An LDA analysis algorithm and the content of the parameter matrix β will be described in detail later.

When the plurality of sample documents are analyzed by LDA, the first parameter generation section 28 uses a predetermined value or a value set at random as a parameter initial value. Further, the first parameter generation section 28 uses a value preset by a user or another input as the number of topics included in the plurality of sample documents.

The second parameter generation section 30 performs LDA analysis on the document set acquired by the document acquisition section 22 to generate a parameter matrix expressing a probability that each of a plurality of words included in the document set is included in each of a plurality of topics. The parameter matrix corresponds to the parameter matrix β calculated as a result of the LDA analysis.

When a document set is analyzed by LDA, the second parameter generation section 30 uses, as a parameter initial value, each value included in the initial parameter matrix generated by the first parameter generation section 28. Further, the second parameter generation section 30 uses a value preset by the user or the like as the number of topics included in the document set. In this case, the second parameter generation section 30 may use a number of topics more than the number of topics used when the first parameter generation section 28 performs LDA analysis on the plurality of sample documents.

Based on the parameter matrix generated by the second parameter generation section 30, the clustering section 32 clusters the document set acquired by the document acquisition section 22 into a plurality of clusters. Further, based on the parameter matrix generated by the second parameter generation section 30, the clustering section 32 may stratify or tier the document set acquired by the document acquisition section 22. Further, based on the parameter matrix generated by the second parameter generation section 30, the clustering section 32 may retrieve documents close in input character or text from the document set acquired by the document acquisition section 22.

Figure 2:
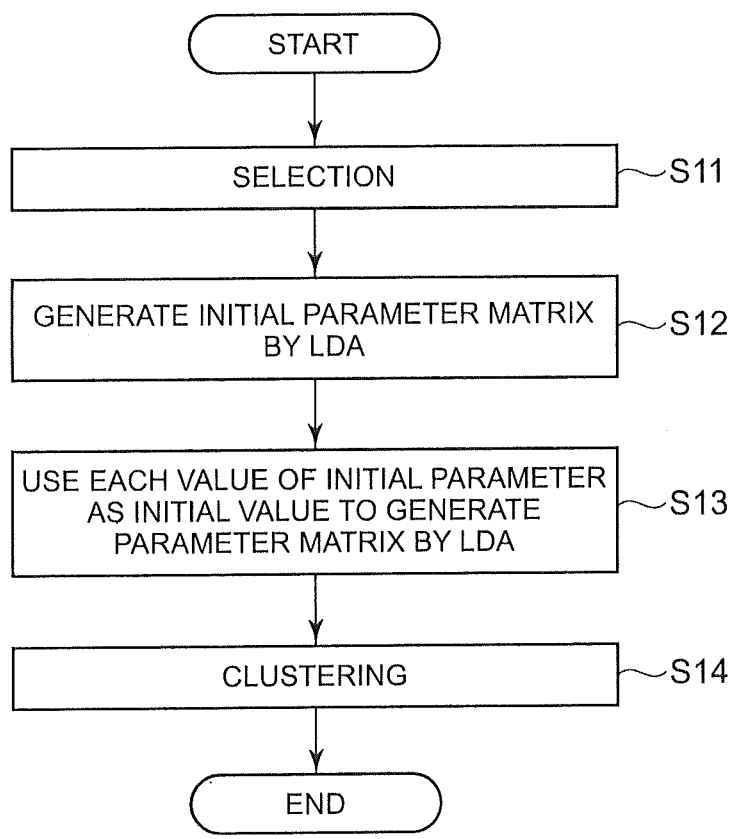
FIG. 2 is a flowchart showing a processing flow of the clustering apparatus according to the embodiment of FIG. 1.

FIG. 2 is a flowchart showing a processing flow of the clustering apparatus 10 according to the embodiment of FIG. 1. The clustering apparatus 10 according to the embodiment executes the following processing steps S11 to step S14 to cluster the document set into a plurality of clusters.

In step S11, the selection section 24 of the clustering apparatus 10 selects, from the document set to be clustered, a preset number of a plurality of sample documents at random. As the number of selected sample documents, the selection section 24 sets such a number that LDA's processing will be completed within a predetermined period and the frequency of appearance of a word on a topic can be estimated throughout the document set.

In step S12, the first parameter generation section 28 of the clustering apparatus 10 performs LDA analysis on the plurality of sample documents selected by the selection section 24 to generate an initial parameter matrix. In this case, the first parameter generation section 28 uses, as a parameter initial value, a predetermined value or a value set at random to perform LDA analysis.

In step S13, the second parameter generation section 30 of the clustering apparatus 10 performs LDA analysis on the document set acquired by the document acquisition section 22 to generate a parameter matrix. In this case, the second parameter generation section 30 uses, as a parameter initial value, each value of the initial parameter matrix generated in step S12 by the first parameter generation section 28.

Among all words included in the document sets, there may be a word that is not included in the plurality of sample documents. In this case, a value of a new word that is not included in the initial parameter matrix generated by the first parameter generation section 28 is included in the parameter matrix generated by the second parameter generation section 30. In such a case, for example, the second parameter generation section 30 sets the initial value of the word, which is not included in the initial parameter matrix, relatively smaller than the initial values of a plurality of words included in the initial parameter matrix to perform LDA analysis on the document set in order to generate a parameter matrix.

For example, the second parameter generation section 30 sets the initial value of the word, which is not included in the initial parameter matrix generated by the first parameter generation section 28, to a random value smaller than the average of the initial values of a plurality of words included in the initial parameter matrix. As a result, since the second parameter generation section 30 uses an initial value with a high contribution of the analysis results of the plurality of sample documents, the computational cost until the LDA's processes converge can be reduced.

The second parameter generation section 30 may generate a parameter matrix including a topic that is not included in the initial parameter matrix generated by the first parameter generation section 28. In this case, the second parameter generation section 30 sets the initial value of the topic, which is not included in the initial parameter matrix, relatively smaller than a plurality of topics included in the initial parameter matrix to perform LDA analysis on the document set in order to generate a parameter matrix.

For example, the second parameter generation section 30 sets the initial value of the topic, which is not included in the initial parameter matrix, to a random value smaller than the average of the initial values of the plurality of topics included in the initial parameter matrix. As a result, since the second parameter generation section 30 uses an initial value with a high contribution of the analysis results of the plurality of sample documents, the computational cost until the LDA's processes converge can be reduced.

In step S14, the clustering section 32 of the clustering apparatus 10 clusters the document set acquired by the document acquisition section 22 into a plurality of clusters based on the parameter matrix generated by the second parameter generation section 30. In an embodiment, the clustering section 32 generates, for each of the documents included in the document set, a document vector expressing each of the probabilities of appearance of a plurality of topics in the document based on the parameter matrix generated by the second parameter generation section 30. Then, for example, the clustering section 32 clusters the document set into a plurality of clusters to include, in the same cluster, a group of documents close in document vector to one another.

The clustering apparatus 10 performs the above processing so that the plurality of text documents (e.g. document set) can be clustered into a plurality of clusters.

Figure 3:
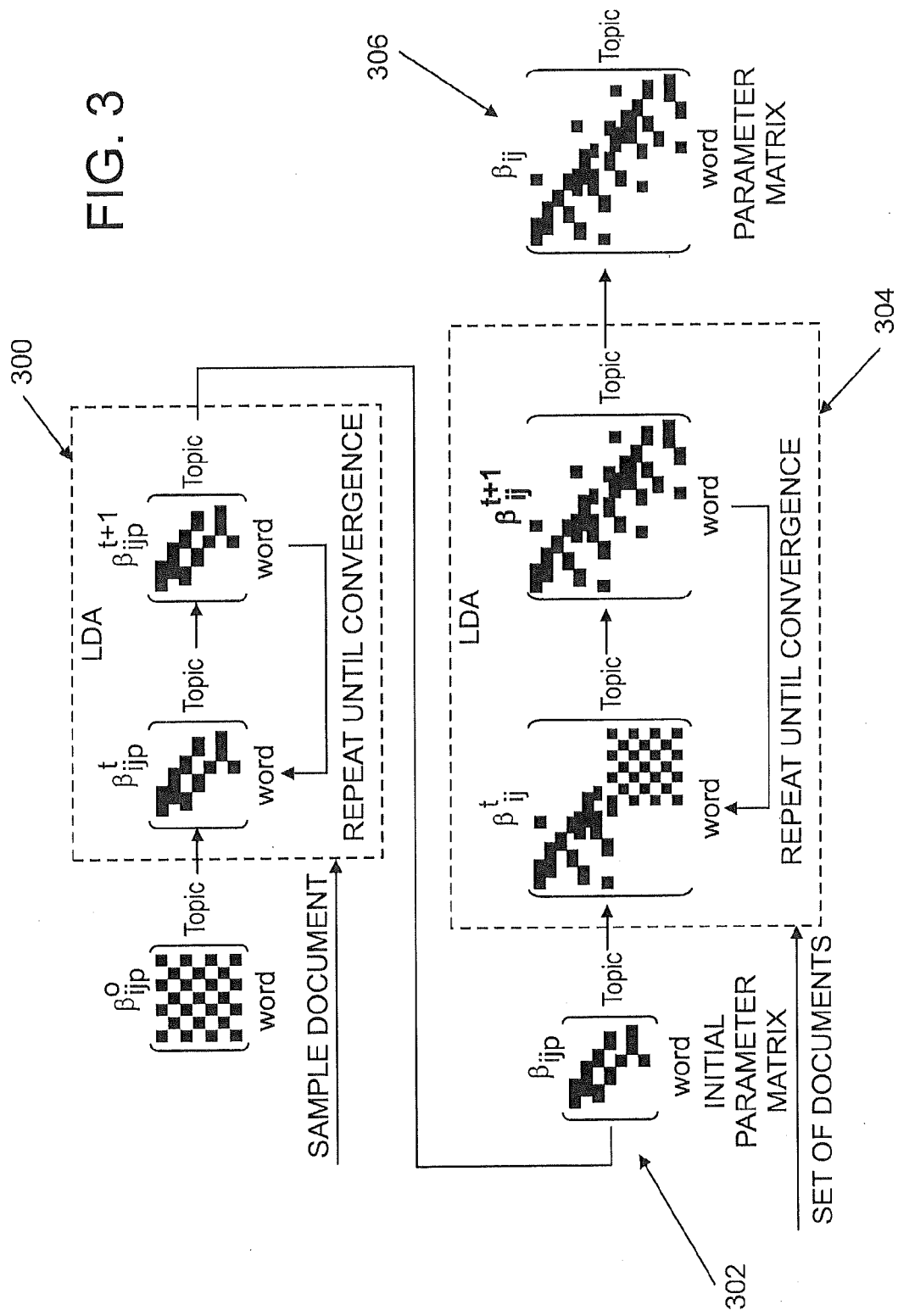
FIG. 3 is a diagram showing an example of processing for a parameter matrix $\beta_{ij}$ in the clustering apparatus according to the embodiment of FIG. 1.

FIG. 3 shows an example of processing for a parameter matrix $\beta_{ij}$ in the clustering apparatus 10 according to the embodiment of FIG. 1. In LDA, the parameter matrix $\beta_{ij}$ expresses the probability of appearance of word j on topic i. The parameter matrix $\beta_{ij}$ is a matrix in which each of all words included in the document set and each of the preset number of topics are indexed.

As depicted, i denotes the index of a topic included in the document set, where i is an integer from 1 to the number of topics of the entire document set). Further, j denotes the index of a word included in the document set, where j is an integer from 1 to the number of words included in the document set.

Upon execution of LDA, the computer performs arithmetic processing for updating each value in the parameter matrix $\beta_{ij}$ while changing the combination of a word and a topic. Further, after completion of the arithmetic processing for all the words and all the topics, the computer determines whether the parameter matrix $\beta_{ij}$ converges to a certain value, and when it does not converge to the certain value, the same processing is repeated. Here, t denotes the number of repetitions of the processing performed by the computer, and $\beta^t$ denotes $\beta$ after the processing is repeated t times.

In block 300, the clustering apparatus 10 first executes LDA on a plurality of sample documents as part of the document set to generate an initial parameter matrix $\beta_{ijp}$ 302. Next in block 304, the clustering apparatus 10 executes LDA on the entire document set to generate a parameter matrix $\beta_{ij}$ 306.

Here, upon execution of LDA, the computer performs processing for each document. Therefore, the computational cost resulting from the execution of LDA is reduced as the number of target documents is reduced. Thus, the clustering apparatus 10 can reduce the computational cost for generating the initial parameter matrix $P_{ijp}$ compared with the computational cost for generating the parameter matrix $\beta_{ij}$.

Further, upon execution of LDA on a plurality of sample documents, the clustering apparatus 10 uses, for example, a predetermined value or a value set at random as the initial value of the initial parameter matrix $\beta_{ij}$. On the other hand, upon execution of LDA on the entire document set, the clustering apparatus 10 uses, as the initial value of the parameter matrix $\beta_{ij}$, each value in the initial parameter matrix $\beta_{ijp}$ as the results of execution of LDA on the sample documents. In processing for each document upon execution of LDA, the computer repeats arithmetic processing until the parameter matrix $\beta_{ij}$ converges to a certain value. The number of repetitions becomes smaller as the initial value is closer to the final value. Therefore, the computational cost resulting from the execution of LDA becomes lower as the initial value of the parameter matrix $\beta_{ij}$ is closer to the final value.

Upon execution of LDA on the entire document set, the clustering apparatus 10 uses, as the initial value of the parameter matrix $\beta_{ij}$, each value in the initial parameter matrix $\beta_{ijp}$ that is estimated to be close to a finally converged value. Therefore, the clustering apparatus 10 can reduce the computational cost upon execution of LDA on the entire document set.

Thus, according to the clustering apparatus 10 of the embodiment, the computational cost increases because LDA is executed on a plurality of sample documents, where the computational cost may be reduced because LDA is executed on the document set by using, as the initial value, the parameter matrix $\beta_{ij}$ including a value close to the converged value. Therefore, according to the clustering apparatus 10, the number of selected sample documents is set appropriately to make the decreasing computational cost larger than the increasing computational cost so that the computational cost can be lowered as a whole. As a result, according to the clustering apparatus 10 of the embodiment, LDA can be executed on a document set including, for example, a large number of documents to perform clustering.

Figure 4:
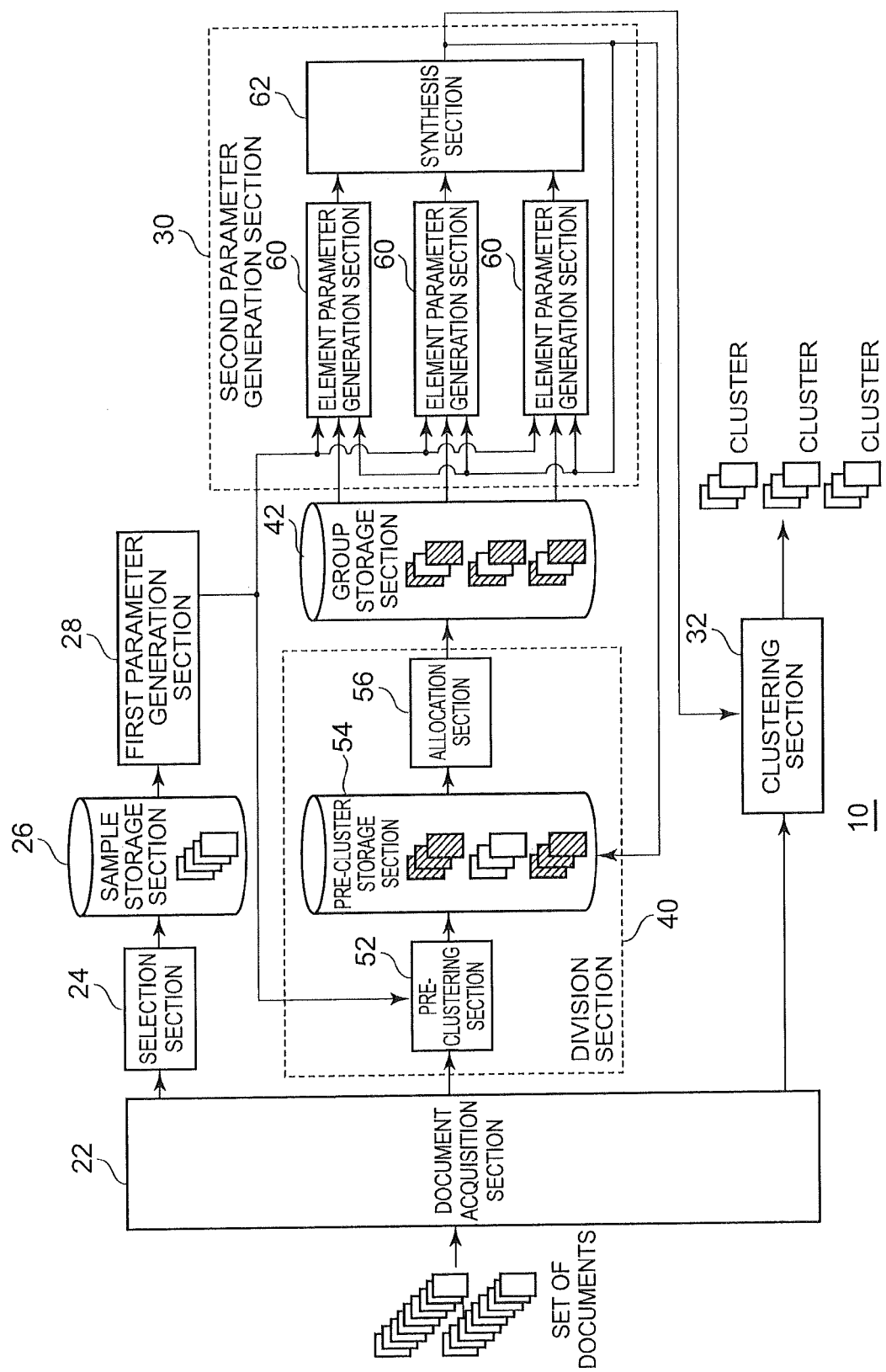
FIG. 4 is a block diagram showing the functional configuration of a clustering apparatus according to another embodiment.

FIG. 4 is a block diagram showing the functional configuration of a clustering apparatus 10 according to an embodiment. Since the clustering apparatus 10 according to the embodiment has a similar structure and functionality to those of the clustering apparatus 10 shown in FIG. 1, where the same numerals are given to components having similar structure and functionality as those provided in the clustering apparatus 10 shown in FIG. 1 to simplify the description except for differences specified herein.

The clustering apparatus 10 includes the document acquisition section 22, the selection section 24, the sample storage section 26, the first parameter generation section 28, a division section 40, a group storage section 42, the second parameter generation section 30, and the clustering section 32.

The division section 40 divides a document set acquired by the document acquisition section 22 into a plurality of groups. As an example, the division section 40 has a pre-clustering section 52, a pre-cluster storage section 54, and an allocation section 56.

Based on the initial parameter matrix generated by the first parameter generation section 28, the pre-clustering section 52 clusters the document set acquired by the document acquisition section 22 into a plurality of clusters. The pre-cluster storage section 54 stores the plurality of clusters clustered by the pre-clustering section 52. The pre-cluster storage section 54 may store links each of which indicates a location where a corresponding document is stored.

The allocation section 56 selects documents from the respective clusters stored in the pre-cluster storage section 54 and allocates the documents to the plurality of groups, respectively. Specifically, the allocation section 56 allocates the document set to the plurality of groups in such a manner that each of the plurality of clusters obtained by clustering the document set based on the initial parameter matrix will be included in equal proportions among groups. This enables the allocation section 56 to generate a plurality of groups close to one another in terms of the results of execution of LDA.

The group storage section 42 stores the plurality of groups divided by the division section 40, respectively. As an example, the group storage section 42 may store links each of which indicates a location where a corresponding document is stored.

The second parameter generation section 30 has a plurality of element parameter generation sections 60 and a synthesis section 62. Each of the plurality of element parameter generation sections 60 is provided to correspond to each of the plurality of groups divided by the division section 40.

Each of the plurality of element parameter generation sections 60 performs LDA analysis on a plurality of documents included in a corresponding group to generate an element parameter matrix expressing a probability that each of a plurality of words included in these documents is included in each of a plurality of topics. The element parameter matrix corresponds to the parameter matrix $\beta$ calculated as a result of the LDA analysis.

Here, in the LDA analysis, each of the plurality of element parameter generation sections 60 uses, as the initial value of the parameter matrix $\beta$, each value included in the initial parameter matrix generated by the first parameter generation section 28. As a result, since each of the plurality of element parameter generation sections 60 sets a value close to a finally converged value as the initial value of the parameter matrix $\beta$, the computational cost can be reduced.

Further, for example, the plurality of element parameter generation sections 60 may use parameter matrices $\beta$ having the same number of topics as one another. Similar to the second parameter generation section 30 shown in FIG. 1, the initial value of the parameter matrix $\beta$ is set in each of the plurality of element parameter generation sections 60.

The synthesis section 62 synthesizes a plurality of element parameter matrices respectively generated by the plurality of element parameter generation sections 60 to generate a parameter matrix. As an example, the synthesis section 62 generates a parameter matrix including a value obtained by averaging values of the same index included in the plurality of element parameter matrices. The synthesis section 62 supplies the generated parameter matrix to the clustering section 32.

The synthesis section 62 may feed the generated parameter matrix back to the plurality of element parameter generation sections 60 to cause the plurality of element parameter generation sections 60 to generate element parameter matrices again. In this case, each of the plurality of element parameter generation sections 60 sets, as the initial value, each value in the parameter matrix is fed back to perform LDA analysis on the plurality of documents included in a corresponding group in order to generate an element parameter matrix again. Then, the synthesis section 62 synthesizes a plurality of element parameter matrices each of which is generated by using, as the initial value, each value in the parameter matrix fed back to generate a parameter matrix again. This enables the second parameter generation section 30 to generate a precise parameter matrix.

Further, the division section 40 may carry out the above-mentioned feedback operation repeatedly. This enables the second parameter generation section 30 to generate a more precise parameter matrix.

In addition, the synthesis section 62 may feed the generated parameter matrix back to the division section 40. In this case, the division section 40 divides the document set into a plurality of groups again in such a manner that each of the plurality of clusters obtained by clustering the plurality of documents based on the parameter matrix fed back will be included in equal proportions among groups. Then, each of the plurality of element parameter generation sections 60 performs LDA analysis on a plurality of documents included in a corresponding group divided again to generate an element parameter matrix. This enables the division section 40 to generate a plurality of groups closer to one another in terms of the results of LDA.

Figure 5:
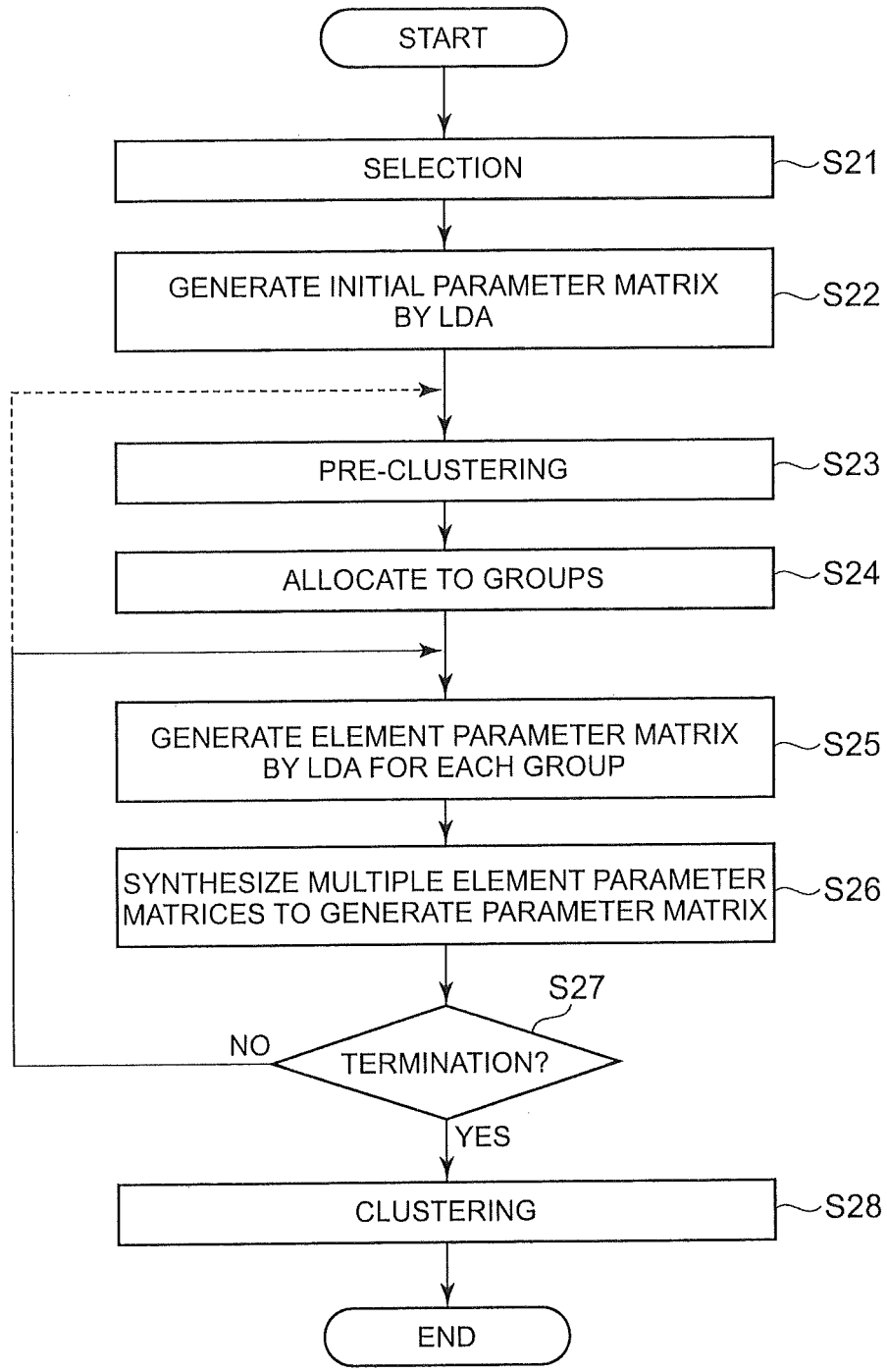
FIG. 5 is a flowchart showing a processing flow of the clustering apparatus according to the embodiment of FIG. 4.

FIG. 5 shows a processing flow of the clustering apparatus 10 according to the embodiment of FIG. 4. The clustering apparatus 10 according to the embodiment executes the following processing steps S21 to S28 to cluster a document set into a plurality of clusters.

In step S21, the selection section 24 of the clustering apparatus 10 selects a plurality of sample documents from the document set to be clustered. Processing in step S21 is the same as processing in step S11 of FIG. 2.

In step S22, the first parameter generation section 28 of the clustering apparatus 10 performs LDA analysis on the plurality of sample documents selected by the selection section 24 to generate an initial parameter matrix. Processing in step S22 is the same as processing in step S12 of FIG. 2.

In step S23, the pre-clustering section 52 of the clustering apparatus 10 clusters, based on the initial parameter matrix generated by the first parameter generation section 28, the document set acquired by the document acquisition section 22 into a plurality of clusters. As an example, based on the initial parameter matrix generated by the first parameter generation section 28, the pre-clustering section 52 generates, for each document included in the document set, a document vector expressing each of the probabilities of appearance of a plurality of topics in the document. Then, as an example, the pre-clustering section 52 clusters the document set into a plurality of clusters in such a manner that a group of documents close in document vector to one another are included in the same cluster.

In step S24, the allocation section 56 of the clustering apparatus 10 allocates the document set to a plurality of groups in such a manner that each of the plurality of clusters clustered by the pre-clustering section 52 is included in equal proportions among groups.

In an example, the pre-clustering section 52 clusters in step S23 a set of 900 documents into cluster A, cluster B, and cluster C, each of which has 300 documents. When these documents are allocated to three groups, the pre-cluster storage section 54 allocates the documents in such a manner that 100 documents respectively included in cluster A, cluster B, and cluster C are included in each of the three groups. This enables the allocation section 56 to allocate the documents in the document set to a plurality of groups in such a manner that each of the plurality of clusters is included in equal proportions among groups.

In step S25, each of the plurality of element parameter generation sections 60 of the clustering apparatus 10 performs LDA analysis on a plurality of documents included in a corresponding group to generate an element parameter matrix expressing a probability that each of a plurality of words included in these documents is included in each of a plurality of topics. In this case, each of the plurality of element parameter generation sections 60 uses, as the parameter initial value, each value included in the initial parameter matrix generated by the first parameter generation section 28.

In step S26, the synthesis section 62 of the clustering apparatus 10 synthesizes a plurality of element parameter matrices respectively generated by the plurality of element parameter generation sections 60 to generate one parameter matrix.

In step S27, the synthesis section 62 determines whether to terminate loop processing. As an example, the synthesis section 62 terminates loop processing when the loop processing is performed a preset number of times or when the generated parameter matrix converges to a certain value.

When the synthesis section 62 determines not to terminate the loop processing ("No" in step S27), the procedure returns to step S25. When the procedure is returned, each of the plurality of element parameter generation sections 60 uses, in step S25, each value included in the parameter matrix synthesized in the previous step S26 by the synthesis section 62 as the parameter initial value. This enables each of the plurality of element parameter generation sections 60 to execute LDA using, as the parameter initial value, a value closer to a converged value.

Further, when the synthesis section 62 determines not to terminate the loop processing ("No" in step S27), the procedure may return to step S23. When the procedure is returned, the pre-clustering section 52 clusters, in step S23, the document set into a plurality of clusters again based on the parameter matrix synthesized in the previous step S26 by the synthesis section 62. Then, when the procedure is returned, the allocation section 56 allocates, in step S24, the document set to a plurality of groups again in such a manner that each of the plurality of clusters clustered again is included in equal proportions among groups. This enables the allocation section 56 to generate a plurality of groups closer to one another in terms of the LDA results.

When the synthesis section 62 determines to terminate the loop processing ("Yes" in step S27), the procedure proceeds to step S28. In step S28, based on the parameter matrix synthesized in the previous step S26 by the synthesis section 62, the clustering section 32 of the clustering apparatus 10 clusters, into a plurality of clusters, the document set acquired by the document acquisition section 22. Processing in step S28 corresponds to processing in step S14 of FIG. 2.

The clustering apparatus 10 according to the modification performs the above processing to enable clustering of a set of documents (a document set) into a plurality of clusters.

Figure 6:
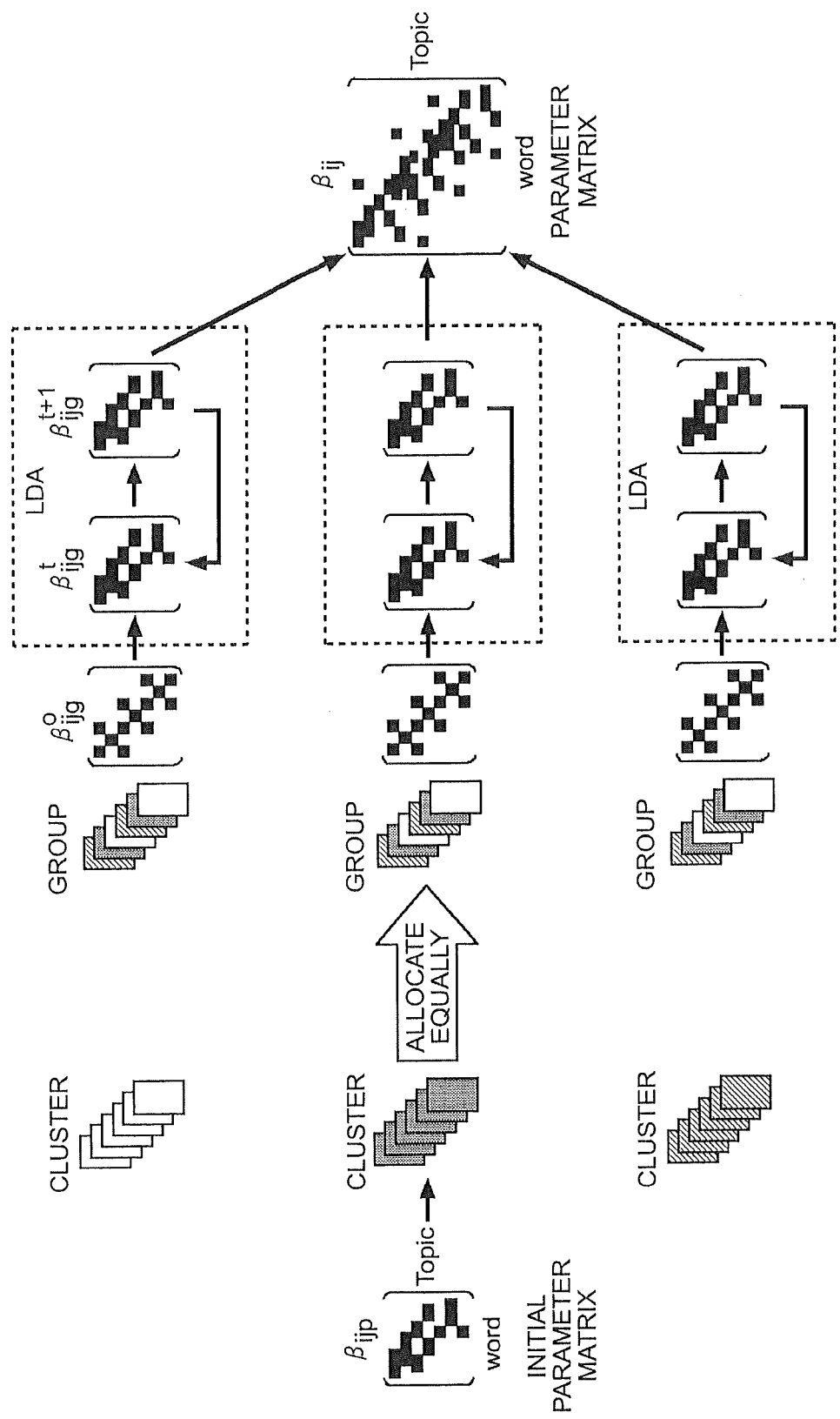
FIG. 6 is a diagram showing an example of processing for a parameter matrix $\beta_{ij}$ in the clustering apparatus according to the embodiment of FIG. 4.

FIG. 6 shows an example of processes for a parameter matrix $\beta_{ij}$ in the clustering apparatus 10 according to the embodiment of FIG. 4. The clustering apparatus 10 according to the modification clusters the document set into a plurality of clusters based on an initial parameter matrix $\beta_{ijp}$ as a result of execution of LDA on the sample documents. Then, the clustering apparatus 10 generates a plurality of groups to include the generated clusters in equal proportions.

When LDA is executed on each of the plurality of groups independently of one another, it is estimated that resulting parameter matrices are close to one another. Therefore, if a plurality of element parameter matrices $\beta_{ijg}$ are synthesized, the clustering apparatus 10 according to the modification can obtain a parameter matrix with less error from normally obtained parameter matrices without feeding back the synthesis results to execute LDA again or with a smaller number of loops even when the synthesis results are fed back. Thus, according to the clustering apparatus 10 of the modification, distributed processing can be performed efficiently to reduce the computational costs.

Figure 7:
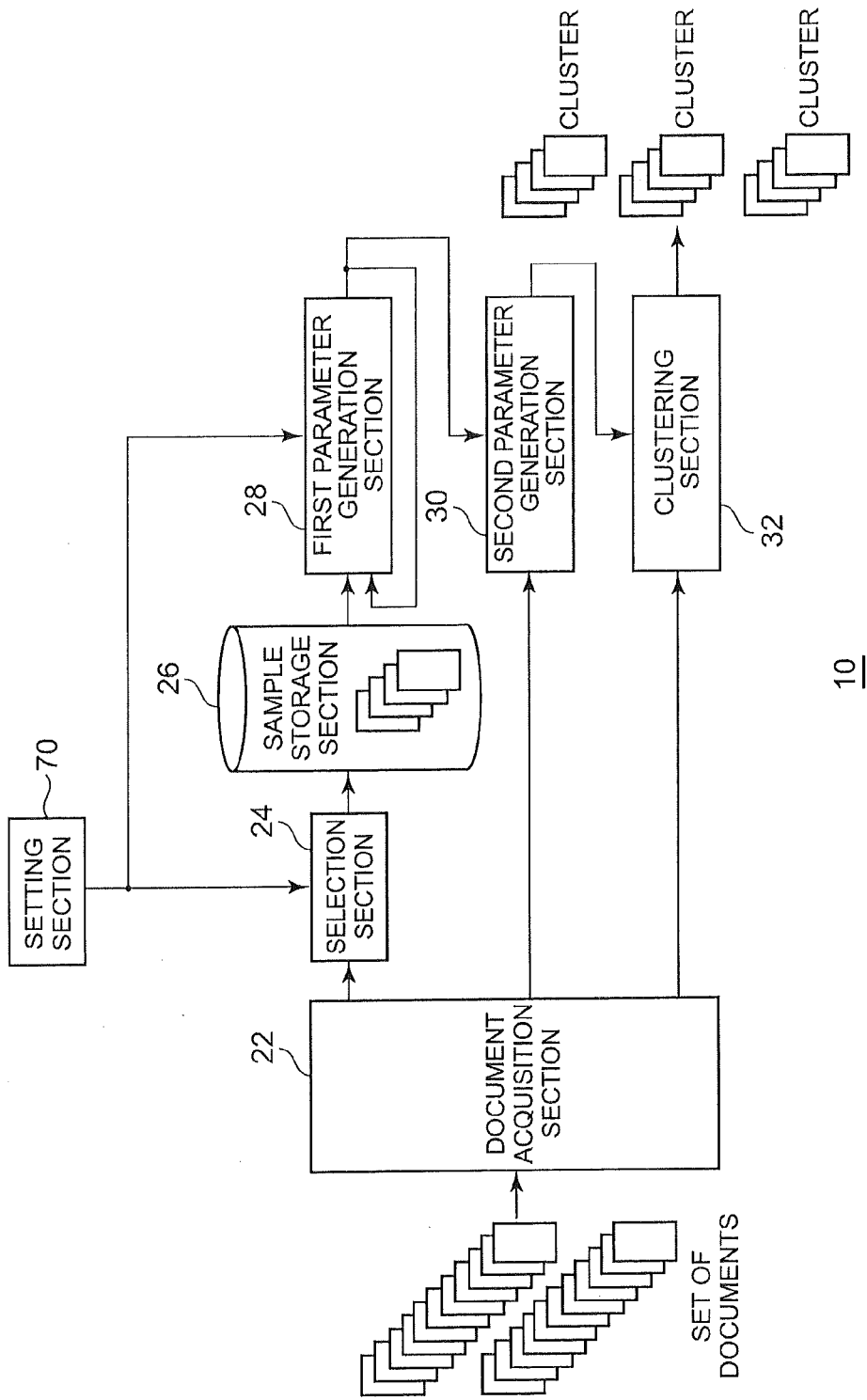
FIG. 7 is a block diagram showing the functional configuration of a clustering apparatus according to a another the embodiment.

FIG. 7 is a block diagram showing the functional configuration of a clustering apparatus 10 according to another of the embodiment. Since the clustering apparatus 10 according to the modification has substantially the same structure and functionality as those of the clustering apparatus 10 shown in FIG. 1, the same numerals are given to components having similar structure and functionality as those provided in the clustering apparatus 10 shown in FIG. 1 to simply description except noted differences.

The clustering apparatus 10 according to the modification includes the document acquisition section 22, the selection section 24, the sample storage section 26, the first parameter generation section 28, the second parameter generation section 30, the clustering section 32, and a setting section 70. The setting section 70 sets, a plurality of times, the number of samples of sample documents selected by the selection section 24. Upon setting the number of samples, the setting section 70 sets the number of samples while increasing the number of selected sample documents in a step-by-step manner.

Each time the number of selections is set, the selection section 24 selects, from the document set, sample documents corresponding in number to the number of selections. Further, each time the number of selections is set, the first parameter generation section 28 performs LDA analysis on a plurality of selected sample documents to generate initial parameters.

When the number of selections is set for the first time, the first parameter generation section 28 uses a random value as each initial value in the parameter matrix to perform LDA analysis on the selected sample documents in order to generate an initial parameter matrix. Then, from the second time on, the first parameter generation section 28 uses, as the initial value, each value included in the previously generated initial parameter matrix to perform LDA analysis on the selected sample documents in order to generate an initial parameter matrix.

It is preferred that the number of selected sample documents be such a number that LDA processes will be completed within a predetermined period and the frequency of appearance of a word on a topic can be estimated throughout the document set. However, if the number of documents included in the document set is sufficiently large, such a number of sample documents that the frequency of appearance of a word on a topic can be estimated throughout the document set cannot be selected in the first selection of sample documents.

Even in such a case, however, the clustering apparatus 10 according to the modification performs LDA analysis on the sample documents a plurality of times while increasing the number of selected sample documents in a step-by-step manner. Thus, according to the clustering apparatus 10 of the modification, LDA can be executed at low computational cost on such a number of sample documents that the frequency of appearance of a word on a topic can be estimated throughout the document set to generate an initial parameter matrix.

FIG. 8 shows an example of program code to be executed by a computer to implement LDA processes. The following will describe the program code to be executed by the computer to implement LDA processes.

First, the concept of LDA will be described. In LDA, the phenomenon of appearance of a word in documents are assumed as follows.

Assumption 1: A plurality of topics are included in documents.

Assumption 2: The frequency of appearance of a word included in a document results from a topic included in the document.

Further, in LDA, it is assumed that a probability $p(\theta|\alpha)$ of appearance of a topic with a probability $\theta$ follows a Dirichlet distribution. Specifically, in LDA, it is assumed that the probability $p(\theta|\alpha)$ of appearance of topic i with the probability $\theta$ is expressed by a probability model according to the Dirichlet distribution as shown in the following Equation (1):

Equation 1:

$$p(\theta|\alpha) = \frac{\Gamma\left(\sum_{i=1}^{k} \alpha_i\right)}{\prod_{i=1}^{k} \Gamma(\alpha_i)} \theta_1^{\alpha_1 - 1} \dots \theta_k^{\alpha_k - 1} \tag{1}$$

In Equation 1, each variable expresses the following content:

i denotes the index of a topic, which takes an integer from 1 to k; k denotes the number of topics included in the document set; k cannot be observed from the actual document set; therefore, k is preset by the user.

$\alpha_i$ denotes an unknown parameter, expressing the frequency of appearance of topic I; $\theta_x$ denotes a probability of at least one appearance of topic x in the document set; $\theta_x^y$ denotes a probability of appearance of topic x in the document set y times.

Next, an equation based on values observable from the actual document set is derived from Equation 1. First, the probability of appearance of word j on topic i is expressed as $\beta_{ij}$. Therefore, the probability of appearance of certain word j associated with topic i is expressed as $\theta_i \beta_{ij}$.

Such a probability that $\theta_i$ takes a certain value can be calculated from Equation 1. When Equation 1 is integrated from 0 to 1 for each topic by using $\theta_i$ as a variable, a probability distribution in the following Equation (2) can be calculated. Equation 2 expresses a probability $p(w|\alpha, \beta)$ that each word j appears at a frequency $w_n^j$.

Equation 2:

$$p(w \mid \alpha, \beta) = \frac{\Gamma\left(\sum_{i=1}^{k} \alpha_i\right)}{\prod_{i=1}^{k} \Gamma(\alpha_i)} \int \left(\prod_{i=1}^{k} \theta_i^{\alpha_i - 1}\right) \left(\prod_{n=1}^{N} \sum_{i=1}^{k} \prod_{j=1}^{V} (\theta_i \beta_{ij})^{w_n^j}\right) d\theta \quad (2)$$

j denotes the index of a word included in the actual document set, taking an integer from 1 to V; V denotes the number of words included in the actual document set.

n denotes the index of a word in a specific document, taking an integer from 1 to N; N is the number of words included in the specific document.

The probability $p(w \mid \alpha, \beta)$ that the word j appears at the frequency $w_n^j$ can be observed from the actual document set. Therefore, if the probability $p(w \mid \alpha, \beta)$ that the word j appears at the frequency $w_n^j$ is observed to calculate $\alpha$ and $\beta$ from Equation 2, the relationship between a topic and a word in the document set can be estimated. Therefore, in LDA, parameters in the probability model of Equation 2 are calculated from the frequency of appearance of a word in each document measured from the actual document set to estimate the relation between the topic and the word in the document set.

Next, an algorithm for causing a computer to implement LDA will be described.

In Equation 2, $\alpha$ and $\beta$ both influence the probability $p(w \mid \alpha, \beta)$ through $\theta$. In this case, it is difficult to have the computer calculate $\alpha$ and $\beta$ using Equation 2. Therefore, when $\alpha$ and $\beta$ are calculated by the computer, a parameter $\gamma_i$ expressing the frequency of appearance of topic i in each document and $\Phi_{ni}$ expressing the frequency of appearance of word n on topic i in the document are introduced.

A probability q is defined by the following Equation 3:

Equation 3:

$$q(\theta, z \mid \gamma, \phi) = q(\theta \mid \gamma) \prod_{n=1}^{N} q(z_n \mid \phi_n) \quad (3)$$

Equation 3 deals with $\theta$ and the probability $\gamma_i$ of appearance of a topic in a document independently of each other, which are expressed in the form of a simple product. This is because $\gamma_i$ and $\Phi_{ni}$ are parameters in each document.

Here, $\Phi_{ni}$ and $\gamma_i$ are defined as in the following Equation 4 and Equation 5 to approximate Equation 3 to Equation 2

Equations 4 and 5:

$$\phi_{ni} \propto \beta_{iw_n} \exp\{E_q[\log(\theta_i) \mid \gamma]\} \quad (4)$$

$$\gamma_i = \alpha_i + \sum_{n=1}^{N} \phi_{ni} \quad (5)$$

$E_q[\log(\theta_i) \mid \gamma]$ in Equation 4 is a value obtained by calculating an expected value of $\log(\theta i)$ from the probability $p(\theta \mid \gamma)$. Specifically, $E_q[\log(\theta_i) \mid \gamma]$ is expressed by using $\gamma_i$, as in the following Equation 6. Note that $\Psi(x)$ is a first derivation of a gamma function ($\Gamma(x)$).

Equation 6:

$$Eq[\log(\theta_i) \mid \gamma] = \Psi(\gamma_i) - \Psi\left(\sum_{j=1}^{k} \gamma_j\right) \quad (6)$$

When LDA's processes are implemented by the computer, the computer uses the above equations to execute program code as in FIG. 8 on each document. The following will describe the program code in FIG. 8.

The first line of code states that $\Phi_{ni}$ is initialized to 1/k for all i and n. Note that the superscript of $\Phi$ indicates the number of repetitions of the third to ninth lines of code, which is zero upon initialization.

The second line of code states that $\gamma_i$ is initialized to $\alpha_i + N/k$ for all i. Note that the superscript of $\gamma$ indicates the number of repetitions of the third to ninth lines of code, which is zero upon initialization.

The third and ninth lines of code states that the fourth to eighth lines of code are repeatedly executed until $\gamma_i^t$ converges to a certain value for all i. Note that the superscript t of $\gamma$ indicates the number of repetitions of the third to ninth lines of code.

The fourth line of code states that the fifth to eighth lines of code are executed N times and the value of n is incremented one by one from 1 to N.

The fifth line of code states that the sixth to seventh lines of code are executed k times and the value of i is incremented one by one from 1 to k.

The sixth line of code states that $\beta_{iw_n} \exp(\Psi(\gamma_i^t))$ is substituted for $\Phi_{ni}^{t+1}$. Note that the superscript t of $\Phi$ indicates the number of loops of the third to ninth lines of code. Further, t+1 denotes the number of loops in the next loop processing.

The seventh line of code states that $\Phi_{ni}^{t+1}$ is so normalized for each n that the total value of $\Phi_{ni}^{t+1}$ for all i will be "1."

The eighth line of code states that a value in the following Equation (7) is substituted for $\gamma_i^{t+1}$.

Equation 7:

$$\alpha_i + \sum_{n=1}^{N} \Phi_{ni}^{t+1} \quad (7)$$

The computer executes the above first to ninth lines of code on each of a plurality of documents, respectively. Then, the computer updates $\alpha$ and $\beta$ from the calculated $\gamma_i$, and $\Phi_{ni}$ each time the execution of program code like that in FIG. 8 is completed for each document.

Specifically, the computer updates $\beta_{ij}$ according to the following Equation 8 each time the execution of the program code is completed for each document.

Equation 8:

$$\beta_{ij} \propto \sum_{d=1}^{M} \sum_{n=1}^{N_d} \Phi_{dni}^* w_{dn}^j \quad (8)$$

d denotes the index of a document, taking an integer from 1 to M. M denotes the number of documents included in the document set. Further, the superscript asterisk of $\Phi$ expresses the number of repetitions of processing for one document until $\gamma_{dni}$ converges to a certain value. In other words, $\beta_{ij}$ in Equation 8 expresses that a value obtained by multiplying the probability of appearance of a word on each topic in each document by the frequency of appearance of the word in the document is proportional to a value as a result of adding up values for all documents.

Then, after completion of processing for all the documents, the computer outputs finally obtained $\beta_{ij}$ as a parameter matrix expressing the probability of appearance of word j on certain topic i in the document set.

In the clustering apparatus 10 according to the embodiment, the first parameter generation section 28 executes the program code shown in FIG. 8. Further, in the clustering apparatus 10 according to the embodiment, the second parameter generation section 30 uses, as the first and second lines of code in the program code shown in FIG. 8, $\alpha_i$ and $\beta_{ij}$ generated by the first parameter generation section 28 to initialize $\gamma_i^0$ and $\Phi_{ni}^0$. Thus, the clustering apparatus 10 according to the embodiment can reduce the number of loops from the third line to the ninth line to reduce the computational cost.

Figure 9:
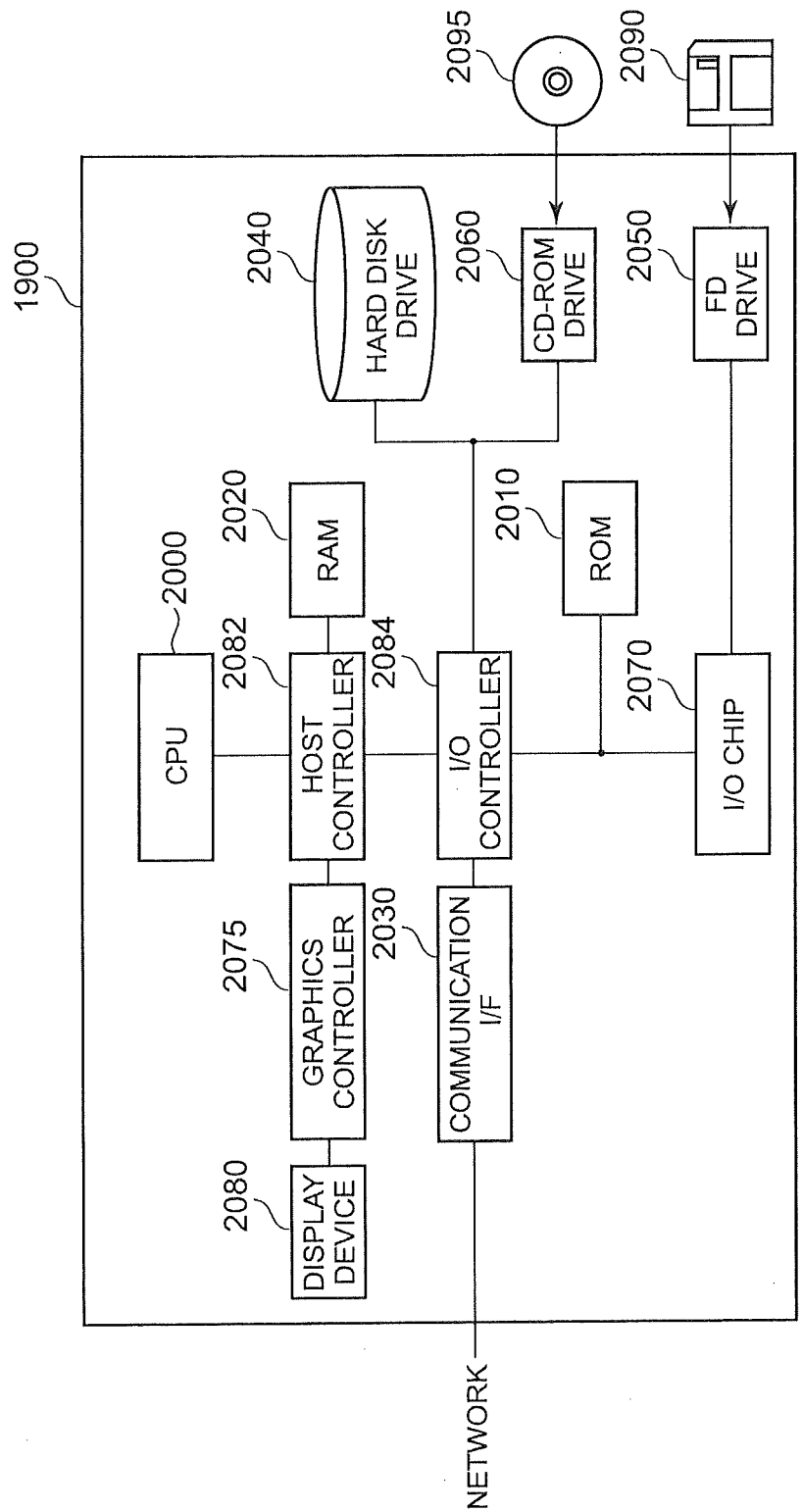
FIG. 9 is a block diagram showing an example of the hardware configuration of a computer according to an embodiment.

FIG. 9 is a block diagram showing an example of the hardware configuration of a computer 1900 according to the embodiment. The computer 1900 according to the embodiment includes: a CPU peripheral section having a CPU 2000, a RAM 2020, and a graphics controller 2075, which are interconnected by a host controller 2082, and a display device 2080; an input/output section having a communication interface 2030, a hard disk drive 2040, and a CD-ROM drive 2060, which are connected by an input/output controller 2084 to the host controller 2082; and a legacy input/output section having a ROM 2010, a flexible disk drive 2050, and an input/output chip 2070, which are connected to the input/output controller 2084.

The host controller 2082 connects the RAM 2020 with the CPU 2000 and the graphics controller 2075 that access the RAM 2020 at a high transfer rate. The CPU 2000 operates based on programs stored in the ROM 2010 and the RAM 2020 to control each section. The graphics controller 2075 acquires image data generated by the CPU 2000 and the like on a frame buffer provided in the RAM 2020 and displays the image data on the display device 2080. Instead, the graphics controller 2075 may internally include the frame buffer for storing image data generated by the CPU 2000 and the like.

The input/output controller 2084 connects the host controller 2082 with the communication interface 2030, the hard disk drive 2040, and the CD-ROM drive 2060 as relatively high-speed I/O devices. The communication interface 2030 communicates with other devices through a network. The hard disk drive 2040 stores programs and data used by the CPU 2000 in the computer 1900. The CD-ROM drive 2060 reads a program and data from a CD-ROM 2095 to provide them to the hard disk drive 2040 through the RAM 2020.

Also connected to the input/output controller 2084 are relatively low-speed I/O devices, namely, the ROM 2010, the flexible disk drive 2050, and the input/output chip 2070. The ROM 2010 stores a boot program executed by the computer 1900 on start-up and/or programs or the like depending on the hardware of the computer 1900. The flexible disk drive 2050 reads a program or data from a flexible disk 2090 to provide it to the hard disk drive 2040 through the RAM 2020. The input/output chip 2070 not only connects the flexible disk drive 2050 to the input/output controller 2084, but also connects various I/O devices to the input/output controller 2084 through, for example, a parallel port, a serial port, a keyboard port, a mouse port, and the like.

A program provided to the hard disk drive 2040 through the RAM 2020 is stored on a recording medium, such as the flexible disk 2090, the CD-ROM 2095, or an IC card, and provided by the user. The program is read from the recording medium, installed in the hard disk drive 2040 inside the computer 1900 through the RAM 2020, and executed by the CPU 2000.

Programs installed on the computer 1900 to cause the computer 1900 to function as a clustering apparatus 10 include a document acquisition module, a selection module, a sample storage module, a first parameter generation module, a second parameter generation module, and a clustering module. These programs or modules work on the CPU 2000 and the like to cause the computer 1900 to function as the document acquisition section 22, the selection section 24, the sample storage section 26, the first parameter generation section 28, the second parameter generation section 30, and the clustering section 32, respectively.

Information processing described in these programs is read into the computer 1900 to function as specific means implemented by software in cooperation with the above-mentioned various hardware resources, namely, as the document acquisition section 22, the selection section 24, the sample storage section 26, the first parameter generation section 28, the second parameter generation section 30, and the clustering section 32. Then, information is computed or processed by these specific means depending on the intended use of the computer 1900 in the embodiment, thus building a specific clustering apparatus 10 according to the intended use.

As an example, when the computer 1900 communicates with an external device or the like, the CPU 2000 executes a communication program loaded on the RAM 2020 to instruct the communication interface 2030 to perform communication processing based on the processing content described in the communication program. Under the control of the CPU 2000, the communication interface 2030 reads send data stored in a buffer space or the like provided in a storage device, such as the RAM 2020, the hard disk drive 2040, the flexible disk 2090, or the CD-ROM 2095, to send the data to a network, or writes receive data received from the network into a receive buffer space provided in the storage device. Thus, the communication interface 2030 may transfer data exchanged with the storage device by the DMA (Direct Memory Access) method. Instead, the CPU 2000 may read data from the storage device or the communication interface 2030 as a source and write the data to the communication interface 2030 or the storage device as a destination to transfer the data to be sent or received.

Further, the CPU 2000 reads, into the RAM 2020, all or necessary part of files or databases stored in an external storage device, such as the hard disk drive 2040, the CD-ROM drive 2060 (CD-ROM 2095), or the flexible disk drive 2050 (flexible disk 2090) by means of DMA transfer or the like to perform various processing on the data in the RAM 2020. Then, the CPU 2000 saves the processed data back to the external storage device by means of DMA transfer or the like. In such processing, the RAM 2020 can be considered to be a temporary storage of the content of the external storage device. Therefore, in the embodiment, the RAM 2020, the external storage device, and the like are collectively referred to as the memory, the storage section, the storage device, or the like. Various programs in the embodiment and various kinds of information such as data, tables, and databases are stored in such storage device as targets of information processing. Note that the CPU 2000 can hold part of the content of the RAM 2020 in a cache memory to perform reading and writing on the cache memory. Even in such a form, since the cache memory serves as part of the function of the RAM 2020, the cache memory shall be included in the RAM 2020, the memory, and/or the storage device in the embodiment except for cases where the cache memory needs to be distinguished from others.

Further, the CPU 2000 performs various processing on the data read from the RAM 2020 as specified in a sequence of instructions of a program, such as various arithmetic operations described in the embodiment, information processing, conditional determinations, and processing for searching and replacing information, and saves the processed data back to the RAM 2020. For example, when a conditional determination is made, the CPU 2000 compares any of various variables shown in the embodiment with any other variable or constant to determine whether it meets a condition, such as larger, smaller, not less than, not more than, or equal to, and when the condition is satisfied (or unsatisfied), the procedure branches to a different instruction or calls a sub-routine.

Further, the CPU 2000 can retrieve information stored in a file or a database in the storage device. For example, when a plurality of entries are stored in the storage device in such a manner to associate the attribute value of a second attribute with the attribute value of a first attribute, the CPU 2000 retrieves, from the plurality of entries stored in the storage device, an entry with the attribute value of the first attribute matching a specified condition to read the attribute value of the second attribute stored in the entry so that the attribute value of the second attribute associated with the first attribute that matches a predetermined condition can be obtained.

The above-mentioned programs or modules may be stored on an external recording medium. As the recording media, an optical recording medium such as DVD or CD, a magnetooptical recording medium such as MO, a tape medium, and a semiconductor memory such as an IC card can be used in addition to the flexible disk 2090 and the CD-ROM 2095. Further, a storage device such as a hard disk or a RAM provided in a server system connected to a private communication network or the Internet may also be used as a recording medium to provide a program to the computer 1900 through the network.

In one embodiment, an apparatus for clustering a plurality of documents comprises: a selection section for selecting a plurality of sample documents from the plurality of documents; a parameter generation section for analyzing the plurality of sample documents to generate a parameter matrix expressing a probability that each of a plurality of words included in the plurality of sample documents is included in each of a plurality of topics; and a clustering section for clustering the plurality of documents into a plurality of clusters based on the parameter matrix. In another embodiment a program for causing a computer to function as the above apparatus is provided.

In an embodiment, method for clustering a plurality of documents, comprises: selecting a plurality of sample documents from the plurality of documents; analyzing the plurality of sample documents to generate a parameter matrix expressing a probability that each of a plurality of words included in the plurality of sample documents is included in each of a plurality of topics; and clustering the plurality of documents into a plurality of clusters based on the parameter matrix.

In yet another embodiment a program for causing a computer to function as an apparatus is provided, the apparatus comprising: a selection section for selecting a plurality of sample documents from a plurality of documents; a first parameter generation section for analyzing the plurality of sample documents to generate an initial parameter matrix expressing a probability that each of a plurality of words included in the plurality of sample documents is included in each of a plurality of topics; and a second parameter generation section for analyzing the plurality of documents by using each value included in the initial parameter matrix as an initial value to generate a parameter matrix expressing a probability that each of a plurality of words included in the plurality of documents is included in each of a plurality of topics.

While the present invention has been described with reference to a preferred embodiment, the technical scope of the present invention is not limited to the description of the aforementioned embodiment. It will be obvious to those skilled in the art that various changes and modifications can be added to the aforementioned embodiment. From the appended claims, it will also be obvious that forms to which such changes or modifications are added shall be included in the technical scope of the present invention.

The operations, the procedure, the steps, and the execution sequence of processes such as steps in the apparatus, system, program, and method described in the appended claims and the specification, and shown in the accompanying drawings are not particularly specified as "ahead of", "prior to", or the like. It should be noted that the operations and the like can be carried out in any order unless output of the previous process is used in the subsequent process. In the appended claims, the specification, and the operation flows in the drawings, "first", "next", and the like are used for convenience sake, but it does not mean that it is imperative to carry out the operations and the like in this order.

The invention claimed is:

1. An apparatus comprising:
   a selection section for selecting a plurality of sample documents from a plurality of documents;
   a first parameter generation section for analyzing the plurality of sample documents using preset values as initial values to generate an initial parameter matrix expressing a probability that each of a plurality of words included in the plurality of sample documents is included in each of a plurality of topics; and
   a second parameter generation section for analyzing the plurality of documents by using each value included in the initial parameter matrix as an initial value to generate a parameter matrix expressing a probability that each of a plurality of words included in the plurality of documents is included in each of a plurality of topics,
   wherein the second parameter generation section includes:
      a division section for dividing the plurality of documents into a plurality of groups, the division section including:
         a pre-clustering section for clustering the plurality of documents into a plurality of clusters based on the initial parameter matrix; and
         an allocation section for allocating each of documents in the plurality of clusters to each of the plurality of groups, wherein the allocation section allocates the plurality of documents to the plurality of groups in such a manner that each of the plurality of clusters obtained by clustering the plurality of documents based on the initial parameter matrix is included in equal proportions among groups;
      a plurality of element parameter generation sections, each of which is provided to correspond to each of the plurality of groups to analyze a plurality of documents included in a corresponding group by using each value in the initial parameter matrix as an initial value in order to generate an element parameter matrix expressing a probability that each of a plurality of words included in the plurality of documents included in the corresponding group is included in each of a plurality of topics; and a synthesis section for synthesizing a plurality of element parameter matrices to generate the parameter matrix, wherein the synthesis section:

feeds the calculated parameter matrix back to each of the plurality of element parameter generation sections, each of the plurality of element parameter generation sections uses, as an initial value, each value in the parameter matrix fed back to analyze a plurality of documents included in a corresponding group in order to generate the element parameter matrix again, synthesizes the plurality of element parameter matrices generated by using, as the initial value, each value in the parameter matrix fed back to generate the parameter matrix again, and feeds the calculated parameter matrix back to the division section, wherein the division section divides the plurality of documents into the plurality of groups again in such a manner that each of the plurality of clusters obtained by clustering the plurality of documents based on the parameter matrix fed back is included in equal proportions among groups, and each of the plurality of element parameter generation sections analyzes a plurality of documents included in a corresponding group divided again to generate the element parameter matrix.

2. The apparatus according to claim 1, wherein the first parameter generation section and the second parameter generation section generate the initial parameter matrix and the parameter matrix by means of Latent Dirichlet Allocation.

3. The apparatus according to claim 2, wherein the second parameter generation section generates the parameter matrix including a topic that is not included in the initial parameter matrix.

4. The apparatus according to claim 3, wherein the second parameter generation section sets an initial value of the topic, which is not included in the initial parameter matrix, the initial value of the topic being smaller than an average of initial values of a plurality of topics included in the initial parameter matrix to analyze the plurality of documents in order to generate the parameter matrix.

5. The apparatus according to claim 4, wherein the second parameter generation section sets an initial value of a word, which is not included in the initial parameter matrix, the initial value of the word being smaller than an average of initial values of a plurality of words included in the initial parameter matrix to analyze the plurality of documents in order to generate the parameter matrix.

6. The apparatus according to claim 1, further comprising a setting section for setting the number of selected sample documents plural times while increasing the number of selections in a step-by-step manner, wherein the selection section selects sample documents corresponding in number to a number of selections from the plurality of documents each time the number of selections is set, the first parameter generation section analyzes the plurality of sample documents selected each time the number of selections is set to generate the initial parameter and, upon setting the number of selections from the second time on, the first parameter generation section analyzes the plurality of sample documents selected by using, as an initial value, each value included in the previously generated initial parameter matrix to generate the initial parameter matrix, and the second parameter generation section analyzes the plurality of documents by using, as the initial value, each value included in the initial parameter matrix generated by setting the number of selections a predetermined number of times to generate the parameter matrix.

7. The apparatus according to claim 1, further comprising a clustering section for clustering the plurality of documents based on the parameter matrix generated by the second parameter generation section.

8. A method comprising:

selecting a plurality of sample documents from a plurality of documents;

analyzing the plurality of sample documents using preset values as initial values to generate an initial parameter matrix expressing a probability that each of a plurality of words included in the plurality of sample documents is included in each of a plurality of topics;

analyzing the plurality of documents by using each value included in the initial parameter matrix as an initial value to generate a parameter matrix expressing a probability that each of a plurality of words included in the plurality of documents is included in each of a plurality of topics, the analyzing including:

dividing the plurality of documents into a plurality of groups, the dividing including:

clustering the plurality of documents into a plurality of clusters based on the initial parameter matrix; and allocating each of documents in the plurality of clusters to each of the plurality of groups, wherein the plurality of documents are allocated to the plurality of groups in such a manner that each of the plurality of clusters obtained by clustering the plurality of documents based on the initial parameter matrix is included in equal proportions among groups;

for each of the plurality of groups: analyzing a plurality of documents included in a corresponding group by using each value in the initial parameter matrix as an initial value in order to generate an element parameter matrix expressing a probability that each of a plurality of words included in the plurality of documents included in the corresponding group is included in each of a plurality of topics; and synthesizing a plurality of element parameter matrices to generate the parameter matrix, wherein the synthesizing includes:

feeding the calculated parameter matrix back to each of the plurality of element parameter generation sections, each of the plurality of element parameter generation sections uses, as an initial value, each value in the parameter matrix fed back to analyze a plurality of documents included in a corresponding group in order to generate the element parameter matrix again;

synthesizing the plurality of element parameter matrices generated by using, as the initial value, each value in the parameter matrix fed back to generate the parameter matrix again; and feeding the calculated parameter matrix back to a division section for dividing the plurality of documents into the plurality of groups again in such a manner that each of the plurality of clusters obtained by clustering the plurality of documents based on the parameter matrix fed back is included in equal proportions among groups; and analyzing a plurality of documents included in a corresponding group divided again to generate the element parameter matrix.

9. A computer program product for clustering a plurality of documents, the computer program product comprising:

a non-transitory storage medium readable by a processing circuit and storing instructions for execution by the processing circuit for performing a method comprising:

selecting a plurality of sample documents from a plurality of documents;

analyzing the plurality of sample documents using preset values as initial values to generate an initial parameter matrix expressing a probability that each of a plurality of words included in the plurality of sample documents is included in each of a plurality of topics; and analyzing the plurality of documents by using each value included in the initial parameter matrix as an initial value to generate a parameter matrix expressing a probability that each of a plurality of words included in the plurality of documents is included in each of a plurality of topics, the analyzing including:

dividing the plurality of documents into a plurality of groups, the dividing including:

clustering the plurality of documents into a plurality of clusters based on the initial parameter matrix; and allocating each of documents in the plurality of clusters to each of the plurality of groups, wherein the plurality of documents are allocated to the plurality of groups in such a manner that each of the plurality of clusters obtained by clustering the plurality of documents based on the initial parameter matrix is included in equal proportions among groups;

for each of the plurality of groups: analyzing a plurality of documents included in a corresponding group by using each value in the initial parameter matrix as an initial value in order to generate an element parameter matrix expressing a probability that each of a plurality of words included in the plurality of documents included in the corresponding group is included in each of a plurality of topics; and synthesizing a plurality of element parameter matrices to generate the parameter matrix, wherein the synthesizing includes:

feeding the calculated parameter matrix back to each of the plurality of element parameter generation sections, each of the plurality of element parameter generation sections uses, as an initial value, each value in the parameter matrix fed back to analyze a plurality of documents included in a corresponding group in order to generate the element parameter matrix again;

synthesizing the plurality of element parameter matrices generated by using, as the initial value, each value in the parameter matrix fed back to generate the parameter matrix again; and feeding the calculated parameter matrix back to a division section for dividing the plurality of documents into the plurality of groups again in such a manner that each of the plurality of clusters obtained by clustering the plurality of documents based on the parameter matrix fed back is included in equal proportions among groups; and analyzing a plurality of documents included in a corresponding group divided again to generate the element parameter matrix.

10. The computer program product according to claim 9, wherein analyzing the plurality of sample documents further comprises generating the initial parameter matrix by means of Latent Dirichlet Allocation.

11. The computer program product according to claim 10, wherein analyzing the plurality of documents further comprises generating the parameter matrix by means of Latent Dirichlet Allocation.

* * * * *